No. 783,117. PATENTED FEB. 21, 1905.
S. HALL.
APPLIANCE FOR ATTACHING COVERS TO JUGS, BASINS, JARS,
OR LIKE VESSELS.
APPLICATION FILED SEPT. 10, 1904.

2 SHEETS—SHEET 1.

WITNESSES
Allan Bennett.
Samuel Burgess.

INVENTOR
Silas Hall

No. 783,117. PATENTED FEB. 21, 1905.
S. HALL.
APPLIANCE FOR ATTACHING COVERS TO JUGS, BASINS, JARS, OR LIKE VESSELS.
APPLICATION FILED SEPT. 10, 1904.
2 SHEETS—SHEET 2.
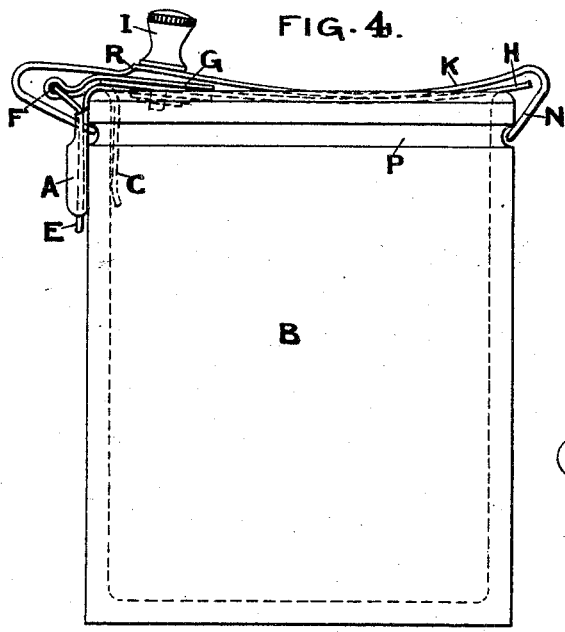
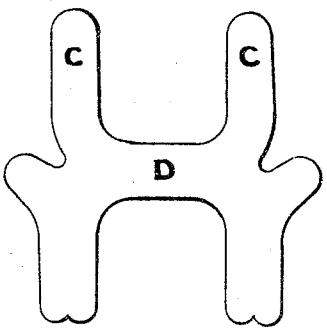
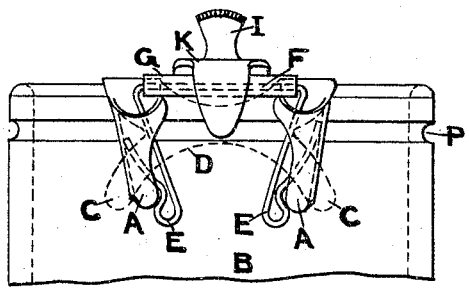
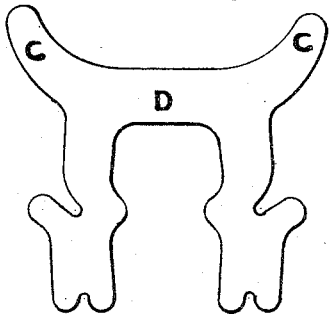
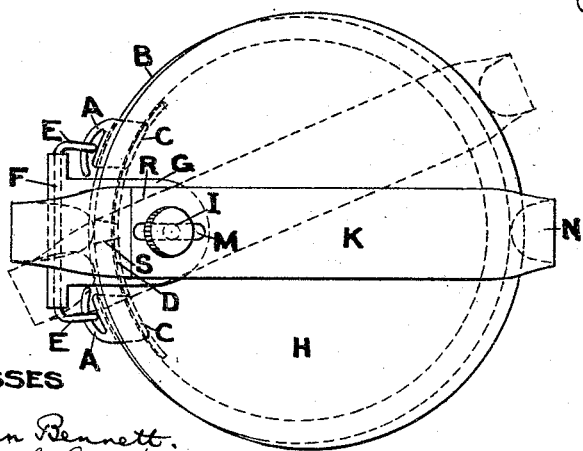
WITNESSES
Allan Bennett
Samuel Burgess
INVENTOR
Silas Hall No. 783,117.

Patented February 21, 1905.

UNITED STATES PATENT OFFICE.

SILAS HALL, OF MORECAMBE, ENGLAND, ASSIGNOR OF ONE-HALF TO JOSEPH FOX, OF LEEDS, ENGLAND.

APPLIANCE FOR ATTACHING COVERS TO JUGS, BASINS, JARS, OR LIKE VESSELS.

SPECIFICATION forming part of Letters Patent No. 783,117, dated February 21, 1905.

Application filed September 10, 1904. Serial No. 224,033.

*To all whom it may concern:*

Be it known that I, SILAS HALL, a subject of the King of Great Britain and Ireland, residing at Morecambe, in the county of Lancaster, England, have invented a new and useful Improvement in Appliances for Attaching Covers to Jugs, Basins, Jars, or Like Vessels, of which the following is a specification.

This invention relates to appliances for attaching lids or covers to jugs, basins, jars, and like vessels used mainly as receptacles for milk, jam, and other food stuffs, the object being to protect the contents of such vessels from dust, flies, and other external contaminating influences.

My said invention consists, essentially, in a hooked spring-clip adapted to engage the rim of the vessel, a lid-clamping device hinged to the said clip, and a detachable lid secured within the clamp and conforming in shape to the rim of the vessel. Means may also be provided in certain cases for regulating the pressure of the lid upon the vessel, thereby enabling the vessel to be made practically air-tight when required.

Figure 1:
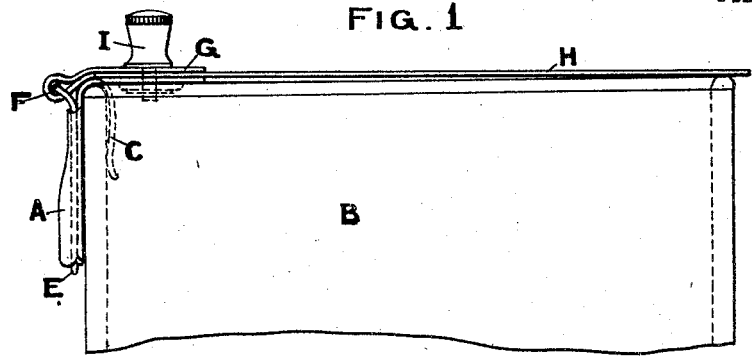
Figure 2:
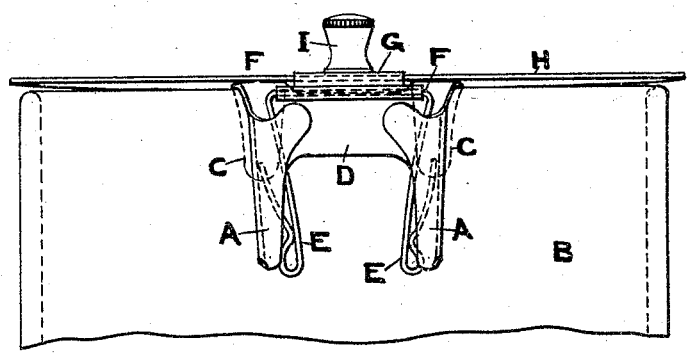
Figure 3:
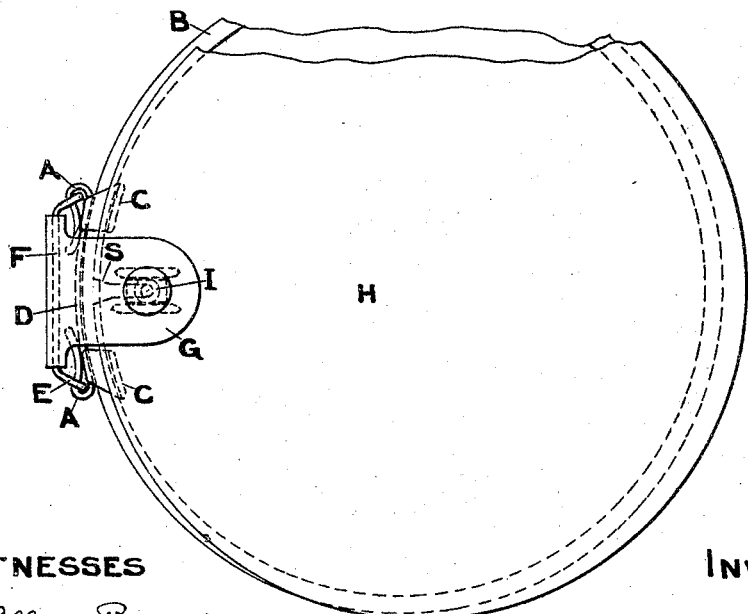

In the drawings, Figure 1 is a side elevation showing the application of my invention to vessels having a plain rim, either straight or curved. Fig. 2 is a front elevation of Fig. 1. Fig. 3 is a plan of Fig. 1. Fig. 4 is a side elevation showing the application of my invention in a somewhat modified form to vessels having a grooved rim. Fig. 5 is a front elevation of Fig. 4. Fig. 6 is a plan of Fig. 4. Figs. 7 and 8 show two suitable forms of blank from which the aforesaid hooked clips may be formed.

Similar letters of reference are employed to indicate corresponding parts throughout the several views.

In carrying out my invention the clip is preferably constructed in the following manner: I provide in the first instance a sheet-metal or other blank, preferably stamped in one of the shapes shown in Figs. 7 and 8. The lower parts of the blank are somewhat broader than the upper parts and are turned back or bent over to form a pair of grooves A A along the opposite vertical edges of the clip. The upper parts of the blank are bent over in the opposite direction, forming a pair of hooks C C, which when pressed upon the rim of the vessel B cause the transverse web D to conform to the surface of the vessel, thus holding and gripping the clip securely in position upon the rim of the vessel whatever may be the diameter of the vessel.

The grooves A A in the clip are for the purpose of receiving and holding a wire spring-staple E, having a straight or square crown F and having its ends turned up outwardly, as shown. This staple E when in position in the grooves A A forms a double-action spring which tends to retain the clip in its proper position, particularly when used upon jugs and similarly-curved vessels. The straight crown F of the staple forms a hinge for a metal or other clamp G, within which the (preferably detachable) lid or cover H is securely held by means of a milled headed thumb-screw I or like device passing through an open slot S in the edge of the lid H. The lid or cover H may be made of sheet metal, paper, or the like or of celluloid or other transparent or semi-transparent material.

When applied to vessels (such, for instance, as jam-jars) having a circumferentially-grooved rim, the lid or cover H may be additionally secured by means of a slotted clamping-plate K, Figs. 4, 5, and 6, which plate K is carried by the clamp G in such a manner as to be rotatable about the thumb-screw I and also to be slidable thereon by means of a slot M. The plate K has a hooked end N engaging the groove P and has also an inclined ridge or shoulder R, upon which bears the milled head of the thumb-screw I. This inclined ridge or shoulder R has the effect, therefore, of depressing the plate K, and consequently tightening the lid or cover H upon the vessel as the plate is moved across the top of the vessel to its diametrical position, while a still further increase of pressure may be obtained by further tightening the thumb-screw I upon the ridge or shoulder R of the plate K. By this means the vessel B may be rendered practically air-tight. The said plate K may be formed, if desired, in two or more parts, having a slot connection or other adjusting device by which the plate may be adapted to various sizes of vessels.

In addition to its use in combination with the detachable hooked spring-clip, as hereinbefore described, the detachable lid or cover H and its clamp G may be applied in a similar manner in conjunction with a fixed hinge, the lid or cover being independently detachable by means of its thumb-screw I and slot S.

What I claim as my invention, and desire to secure by Letters Patent, is—

1. In a closure, the combination, with a hooked clip for engaging with the rim of a vessel and provided with grooves, of a spring-wire staple engaging with the said grooves, a lid, and a clamping device secured to the said lid and pivoted upon the said staple.

2. In a closure, the combination, with a hooked clip for engaging with the rim of a vessel and provided with grooves, of a spring-wire staple engaging with the said grooves, a lid, a clamping device secured to the said lid and pivoted upon the said staple, and a clamping-plate provided with hooks for engaging with the rim of the vessel, said plate being carried by the said clamping device and provided also with an inclined ridge or shoulder for tightening the said lid.

3. In a closure, the combination, with a clip for engaging with the rim of a vessel, of an adjustable lid provided with a slot, a clamping device hinged to the said clip and engaging with the said lid, and a thumb-screw passing through the said slot and securing the said lid to the said clamping device.

In testimony whereof I have signed my name to this specification in the presence of two subscribing witnesses.

SILAS HALL.

Witnesses:
 ALLAN BENNETT,
 SAMUEL BURGESS.